(12) United States Patent
Kelly et al.

(10) Patent No.: US 6,257,018 B1
(45) Date of Patent: Jul. 10, 2001

(54) PFC RECOVERY USING CONDENSATION

(75) Inventors: Richard Martin Kelly, Buffalo; Dante Patrick Bonaquist, Grand Island, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/340,031

(22) Filed: Jun. 28, 1999

(51) Int. Cl.$^7$ ...................................................... F25J 3/00
(52) U.S. Cl. ................................. 62/617; 62/918
(58) Field of Search .............................. 62/625, 617, 918, 62/620

(56) References Cited

U.S. PATENT DOCUMENTS

| | | | |
|---|---|---|---|
| 3,848,313 | 11/1974 | Guyonnet | 29/191.2 |
| 4,952,305 | * 8/1990 | Kummann | 208/340 |
| 5,204,191 | 4/1993 | Dubois et al. | 428/650 |
| 5,333,462 | * 8/1994 | Garot et al. | 62/625 |
| 5,502,969 | 4/1996 | Jin et al. | 62/11 |
| 5,533,338 | 7/1996 | Lee et al. | 62/638 |
| 5,540,057 | 7/1996 | Cheng | 62/625 |
| 5,626,023 | * 5/1997 | Fisher et al. | 62/625 |
| 5,766,693 | 6/1998 | Rao | 427/454 |
| 5,771,712 | * 6/1998 | Campbell et al. | 62/621 |
| 5,771,713 | * 6/1998 | Fisher | 62/625 |
| 5,799,509 | 9/1998 | Finley et al. | 62/638 |

FOREIGN PATENT DOCUMENTS

| | | |
|---|---|---|
| 0334664 A2 | 9/1989 | (EP) . |
| 0771887 A1 | 5/1997 | (EP) . |
| 0899354 A1 | 3/1999 | (EP) . |
| 0949470 A2 | 10/1999 | (EP) . |
| 2745300 | 8/1997 | (FR) . |
| WO9936159 | 7/1999 | (WO) . |

OTHER PUBLICATIONS

M. F. Besser, et al., "Structure and Chemistry of Al–Cu Quasicrystalline Plasma Sprayed Coatings"–Proc. Conf New Horizons in Quasicrystals 1996, pp. 288–295 1997, World Scientific, Singapore XP000921424.

* cited by examiner

*Primary Examiner*—William Doerrler
(74) *Attorney, Agent, or Firm*—Bernard Lau

(57) ABSTRACT

This invention is directed to a method, and a system therefor, for recovering PFC using condensation by passing a PFC-containing feed stream into a condenser, preferably reflux condenser, to effect liquefaction into a PFC-containing condensate and a carrier gas stream, and passing the PFC-containing product into a mass transfer unit to fractionate the PFC-containing condensate into a high volatility PFC stream and a PFC product.

6 Claims, 1 Drawing Sheet

PFC RECOVERY USING CONDENSATION

FIELD OF THE INVENTION

This invention is generally related to the recovery of perfluorcompounds (PFCs). More specifically, this invention is related to a method and a system for the recovery of PFCs using condensation, preferably reflux condensation.

BACKGROUND OF THE INVENTION

PFCs are used in many manufacturing processes. In particular, they are widely used in the manufacture of semiconductor components. The nature of many of these manufacturing processes results in the atmospheric emission of PFCs. Being of high value and of detriment to the environment, it is advantageous to recover these emitted PFCs so that they may be reused.

Examples of PFCs are nitrogen trifluoride ($NF_3$), tetrafluoromethane ($CF_4$), trifluoromethane ($CHF_3$), hexafluoroethane ($C_2F_6$) and sulfur hexafluoride ($SF_6$). In general, PFCs are fully fluorinated compounds of nitrogen, carbon and sulfur. $CHF_3$ is an example which is not fully fluorinated, but due to its similar chemical nature and application with other fluorine saturated PFCs, it is considered a PFC.

The manufacture of semiconductor components produces exhausts which typically comprise PFCs, non-PFC gases, particulate matter and a carrier gas. The flow from one process tool may be as high as 400 standard cubic feet per hour (scfh) and may comprise less than 1% PFCs.

Non-PFC gases may include hydrogen fluoride (HF), silicone tetrafluoride ($SiF_4$), silane tetrahydride ($SiH_4$), carbonyl fluoride ($COF_2$), carbon dioxide ($CO_2$), water ($H_2$), methane ($CH_4$) and carbon monoxide (CO). The carrier gas may be air, nitrogen or another inert gas. The majority of non-PFC gases and particulates are detrimental to PFC recovery processes and need to be removed in pre-purification processes. Some of the non-PFC gases, for example, carbon monoxide, may be inert to PFC recovery processes and may be allowed to pass through with the carrier gas.

The present invention recovers PFCs from the pre-purified carrier gas by condensation utilizing the large differences between the boiling points of PFCs and of various carrier gases. Table 1 gives the atmospheric boiling points and melting points of some common PFCs and nitrogen.

TABLE 1

| Compound | Boiling Point (K.) | Melting Point (K.) |
| --- | --- | --- |
| $N_2$ | 77 | 63 |
| $NF_3$ | 144 | 66 |
| $CF_4$ | 145 | 90 |
| $CHF_3$ | 191 | 118 |
| $C_2F_6$ | 195 | 173 |
| $SF_6$ | 209 | 222 |

Condensation of the PFCs is achieved by cooling the gas stream to temperatures below the dew points of the constituent PFCs. In order to achieve a high PFC recovery efficiency, it is necessary to cool the gas stream below the melting points of some of the lower volatility PFCs. Freezing of PFCs in the condenser is undesirable since this would reduce the efficiency of the condenser and prevent continuous operation. The instant invention contains several facets which prevent PFC freezing.

One, a reflux condenser is preferably used to effect the condensation of PFCs. The condensate in a reflux condenser flows counter-currently to the gas flow from where it came, and is therefore not necessarily further cooled. In general, however, a conventional condenser is applicable in this invention.

Two, this flow regime means that high volatility PFC condensate flows over the regions where low volatility PFCs condense. Low volatility PFCs with a tendency to freeze are soluble in these high volatility PFCs and freezing can be prevented.

Three, in the preferred embodiment, the concentration of high volatility PFCs in the gas stream is raised by recycling them in the system. This is achieved by separating the high volatility PFCs from the recovered PFC product, followed by re-addition up-stream. Raising the concentration of high volatility PFCs in the gas stream lowers the concentration of low volatility PFCs in the PFC condensate and prevents the PFCs from freezing.

Various solutions to recover PFCs from a carrier gas stream has been suggested, some mitigating the problem of PFC freezing when cryogenic means is used for recovery. However, none of the art teaches or suggests the present invention.

A prior method for recovering PFCs from the carrier gas is by condensation/dissolution as shown in U.S. Pat. No. 5,626,023. A solvent is added to the gas stream, which is then cooled to condense out the PFCs and any vaporized solvent. Low volatility PFCs with a tendency to freeze are soluble in the additive solvent. The additive solvent and PFCs are then separated by distillation and the additive solvent is reused. The solvent must be completely removed from the PFC product to prevent loss.

U.S. Pat. No. 5,540,057 provides for the removal of volatile organic compounds (VOCs) from a carrier gas by condensation of the VOCs in a reflux condenser. The VOC laden carrier gas passes up the shell side of a shell and a tube heat exchanger, and is then cooled along a continuous temperature gradient. The VOCs condense out to different extents at different levels and collect on special baffles in the shell side, which can direct a portion out of the condenser and allow a portion to drip back down the condenser as reflux. The cold cleaned carrier gas is then mixed with refrigerant at the exit to the shell side and passes down the tube side to effect the shell side cooling. Freezing of VOCs, specifically benzene, may be inhibited by the addition of a solvent, specifically toluene, to the gas stream.

U.S. Pat. Nos. 5,533,338 and 5,799,509 are examples of condensation freezing for condensing PFCs against a cryogenic fluid. The freezing of low volatility PFCs occurs due to the low temperatures required for high efficiency condensation of the high volatility PFCs. This method is disadvantageous because it is necessary to periodically defrost the frozen PFCs for removal. This results in low refrigeration efficiencies and requires duplicate equipment in order to maintain continuous operation.

Membrane permeation recovers the PFCs from the carrier gas through the differences in membrane permeability. The gas stream is contacted with the feed side of a specific membrane, which allows the carrier gas to preferentially permeate while the PFCs are retained. High separation efficiencies require the use of multiple membranes. PFCs have different permeation characteristics and vary in recovery efficiencies.

Adsorption recovers PFCs from the carrier gas. The gas stream is contacted with an adsorbent which removes the PFCs. The PFCs are then desorbed and removed from the adsorbent bed with a sweep gas. The sweep gas results in a low concentration PFC product. Furthermore, adsorption processes do not have the flexibility to adjust to the large changes in PFC concentrations and carrier gas flow rates which typify gaseous effluent streams.

Yet another PFC recycling method is the energy intensive process of incineration. The gas stream is heated to a high temperature, which prevents emission of the PFCs. Decomposition gases such as hydrogen fluoride and nitrogen oxides are then removed from the flue gas.

It is desirable that PFC recovery systems treat the exhaust from small semiconductor manufacturing tool clusters rather than whole manufacturing facilities. If one system fails, only a fraction of the manufacturing tools are affected. The present invention is therefore primarily intended to treat the exhaust from a small number of tools. However, it may also be scaled-up to treat the exhaust from an entire semiconductor manufacturing facility. It is also an object of this invention to mitigate the problem associated with PFC freezing, while recovering them from a carrier gas stream by cryogenic condensation.

SUMMARY OF THE INVENTION

This invention is directed to a system for recovering PFCs using condensation, preferably reflux condensation. A condenser provides indirect heat exchange from a PFC-containing gaseous stream to effect liquefaction into a PFC-containing condensate and a carrier gas stream. A mass transfer unit is used to fractionate the PFC-containing condensate into a high volatility PFC stream and a PFC product.

This invention is also directed to a method for recovering PFC using condensation, preferably reflux condensation. A PFC-containing feed stream is passed into a condenser to effect liquefaction into a PFC-containing condensate and a carrier gas stream. Also, the PFC-containing product is passed into a mass transfer unit to fractionate the PFC-containing condensate into a high volatility PFC stream and a PFC product.

DETAILED DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

As used herein, the term "high volatility PFCS" means one or more PFCs having an atmospheric boiling point below 150 K. Examples include tetrafluoromethane ($CF_4$) and nitrogen trifluoride ($NF_3$).

As used herein, the term "low volatility PFCs" means one or more PFCs having an atmospheric boiling point above 150 K. Examples include trifluoromethane ($CHF_3$), hexafluoroethane ($C_2F_6$) and sulfur hexafluoride ($SF_6$).

As used herein, the term "indirect heat exchange" means the bringing of two fluid streams into heat exchange relation without physical contact or intermixing of the fluids between each other.

As used herein, the term "condenser" describes a vessel providing indirect heat transfer from a gaseous flow so as to effect the liquefaction of a portion of that flow.

As used herein, the term "condensate" describes a liquefied gas.

As used herein, the term "reflux condenser" describes a condenser wherein at least a portion of the condensate is forced to contact a hotter heat transfer surface than the one which effected its condensation. This re-heating causes at least a portion to be re-evaporated. This is easily effected by cooling an ascending gas stream. The condensate then descends and is warmed. The reflux condenser is preferred, and the general use of a condenser is contemplated in this invention.

As used herein, the term "reflux condensation" describes condensation carried out in a reflux condenser.

As used herein, the term "rectification column" describes a distillation or fractionation zone wherein liquid and vapor phases are counter-currently contacted to effect separation of a fluid mixture. A rectification column is preferred, but the general use of a mass transfer unit which may perform a similar function as the rectification column is contemplated in this invention.

Figure 1:
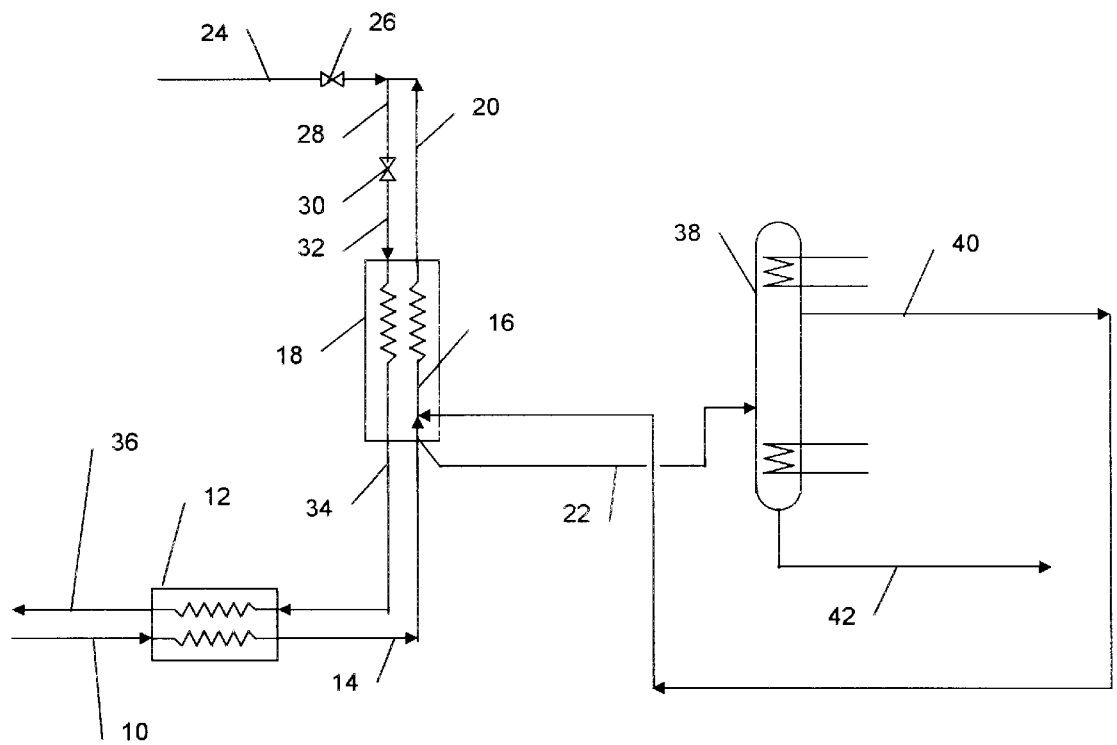
FIG. 1 is a schematic diagram of recovery of PFCs in this invention.

Turning now to FIG. 1, which is a schematic flow diagram, of a preferred embodiment of the system in this invention. Warm gaseous feed stream 10 consists of a carrier gas, high volatility PFCs and low volatility PFCs, pressurized to approximately 95 psia. Particulate impurities and non-PFC gases such as hydrogen fluoride and fluorine will have been removed in a pre-purified stage. Stream 10 enters at elevated pressure after being compressed during the pre-purification stage. Pressure swing adsorption for example, requires pressurization of the gas stream. Other adsorption process, including thermal swing adsorption in the higher pressure level, are applicable. Pressurization is also found to aid separation of the PFCs from the carrier gas and reduces the size of the process equipment. Freezing points of individual PFCs will also be depressed at elevated pressure.

Stream 10 is cooled by indirect heat exchange with refrigerant stream 34 in heat exchanger 12. Stream 10 is cooled to a temperature above that at which PFCs start to condense, in either liquid or solid form. It is important that PFCs do not freeze in heat exchanger 12 because there is no means for removing frozen PFCs.

The cooled gaseous feed stream 14 then exits heat exchanger 12 and enters condenser 18, preferably a reflux condenser, where it combines with high volatility PFC stream 40. In the preferred embodiment stream 40 is a liquid. It will also have a significantly lower temperature than stream 14. This causes stream 40 to flash off such that the resulting mixed stream 16 attains a temperature lower than that of stream 14. The temperature of stream 16 should be approximately that at which PFCs start to condense out. Addition of stream 40 to stream 14 results in mixed stream 16 having a greater high volatility PFC concentration than stream 14.

Stream 16 is cooled counter-currently in condenser 18 by indirect heat exchange with cold refrigerant stream 32. Cooling causes the PFCs to condense and flow out counter-currently to stream 16, forming PFC condensate stream 22. Low volatility PFCs such as hexafluoroethane and sulfur hexafluoride condense out towards the warmer end of the condenser 18, and have a tendency to condense out as solids because they are cooled below their melting points. High volatility PFCs such as carbon tetrafluoride and nitrogen trifluoride condense out towards the colder end of the condenser and will not condense as solids since their melting points are not reached. It is a feature of the operation of condenser 18, that the high volatility PFCs wash over the warmer end of the condenser and act as solvents towards the low volatility PFCs. Freezing of the low volatility PFCs is therefore inhibited. It is a further feature of this embodiment that stream 40 is added to stream 14 to increase the amount of high volatility PFCs with respect to low volatility PFCs. Addition of stream 40 also stabilizes the PFC composition and concentration in condenser 18. This allows condenser 18 to operate under temperature conditions which more closely approximate to steady state, and aid the process control.

Cold carrier gas stream 20 leaves condenser 18 having been treated to remove PFCs. Liquid cryogen stream 24 is added to stream 20 via control valve 26 to produce stream 28. The carrier gas will more usually be nitrogen gas and the liquid cryogen will more usually be liquid nitrogen. The rate of addition of stream 24 is determined by the refrigeration requirements in heat exchanger 12 and condenser 18. Stream 20 will more usually be close to the dew point of the carrier gas in order to condense sufficient of the high volatility PFCs and as such, addition of stream 24, will not usually cause stream 24 to completely vaporize. Stream 28 will therefore usually be two phase. Stream 28 passes through throttle valve 30 to form refrigerant stream 32. The expansion causes a drop in temperature, the required degree of which is determined by the cold end temperature difference of condenser 18 and controlled by the pressure drop through throttle valve 30. Stream 32 passes through condenser 18, warms against mixed stream 14 and exits at the bottom of condenser 18, as stream 34. Stream 34 then passes to heat exchanger 12 to effect the cooling of stream 10. Warm refrigerant stream 36 exits heat exchanger 12. A portion of stream 36 may be used to regenerate adsorption beds in the pre-purification stage. It is also advantageous to use a portion as addition to the semiconductor tool exhaust to maintain the volumetric flow rate in the PFC recovery system constant.

Stream 22 passes to mass transfer unit 38, preferably a rectification column, where high volatility and low volatility PFCs are separated preferably by cryogenic rectification. At the top of mass transfer unit 38, stream 40 is formed and is recycled by adding to stream 14 at the condenser inlet. Stream 40 will also contain carrier gas that was condensed in condenser 18 during PFC removal. Mass transfer unit 38 therefore also raises the PFC concentration efficiency of the system. At the bottom of mass transfer unit 38, liquid PFC product 42 is formed. Under steady state conditions, with 100% PFC recovery, the mass and relative proportion of PFCs entering the system in stream 10 will equal the mass and relative proportion of the PFCs leaving the system in stream 42.

In another embodiment, addition of stream 40 may take place at points other than at the condenser inlet, such as into stream at any point in condenser 18, into stream 16, such that it flows back down as a liquid into condenser 18, into stream 14, prior to condenser 18, directly into heat exchanger 12 and anywhere prior to heat exchanger 12, including the pre-purification stage. Stream 40 may also be two phase or entirely gaseous.

Another embodiment does not require the use of stream 40. Consequently, stream 22 is collected as product. Mass transfer unit 38 is not necessary. This embodiment is particularly applicable where stream 10 comprises enough high volatility PFCs to ensure that the low volatility PFCs do not freeze in condenser 18.

Other types of condensers may be used to carry out the condensation of the PFCs, where stream 40 is used to prevent freezing in the condenser.

Certain types of PFCs may be used as solvents. For example, low volatility PFCs that do not have a high vapor pressure at their freezing point. These include trifluoromethane ($CHF_3$) and octafluoropropane ($C_3F_8$).

Mass transfer unit 38 is used to separate the high volatility PFC from the PFC product. Other than a rectification column, various devices may be used, such as a dephlegmator. Also different means of adding refrigeration to heat exchanger 12 and/or condenser 18 may be used. This includes: one, indirect heat transfer with a cryogen such as liquid nitrogen. Two, mechanical refrigeration produced by a vapor compression cycle utilizing a working fluid which is a mixture of atmospheric gases, hydrofluorocarbons and/or PFCs. Three, mechanical refrigeration produced by the turbo expansion of dry air, nitrogen, argon or mixtures of the same. Four, refrigeration obtained from a pulse tube refrigerator, preferably with the input work to pulse tube provided by a linear motor-compressor. Also it may be convenient to expand cold carrier gas stream 20 through throttle valve 28, prior to adding refrigeration.

Where heat exchanger 12 and condenser 18 are one unit, it is appropriate to carry out condensation in the conventional manner without reflux action.

Multiple condensers, or a condenser with multiple liquid outlets to produce multiple PFC condensate products may be used.

It is also contemplated to operate the system at pressures above and below about 95 psia. For pressure swing adsorption applications, the pressure range of from about 80 psia to about 200 psia, preferably from about 90 psia to about 125 psia, and most preferably at about 95 psia is desirable. For a thermal swing adsorption application, a substantially higher pressure range is used.

EXAMPLE

Stream 10 comprises nitrogen carrier gas with 1,000 ppm $CH_4$, 2,000 ppm $C_2F_6$, and 500 ppm $SF_6$, having been treated to remove non-PFC gases such as HF, $F_2$, $H_2O$) and $CO_2$. Stream 10 has a pressure of 94 psia and a temperature of 288 K.

Stream 10 is cooled to 165 K in heat exchanger 12 to form stream 14, and then passes into condenser 18. Stream 40, comprising $CF_4$ and a portion of nitrogen carrier gas, is flashed into stream 14 at the inlet to the condenser, raising the concentration of $CF_4$ in the resultant stream 16 to 18,200 ppm and lowering the temperature to 157 K.

Figure 2:
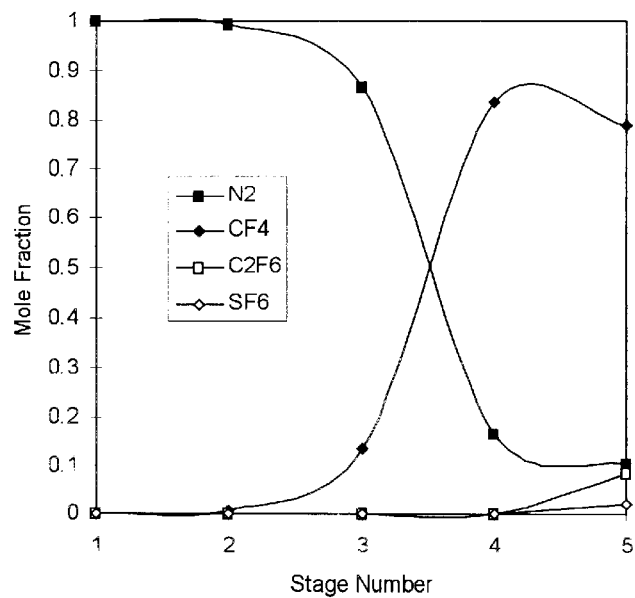
FIG. 2 is a graph showing the condensate composition at various stages in a reflux condenser of this invention.

Stream 16 is cooled in condenser 18 so that the PFCs condense to form stream 22 and the carrier gas exits as stream 20. To ensure high removal efficiency of the PFCs, a portion of the nitrogen carrier gas also condenses in the reflux condenser. At 93 psia, this occurs at 97.3 K. Stream 20 comprises nitrogen with 5 ppm $CF_4$. FIG. 2 shows the composition of the liquid condensate at various stages in the reflux condenser. Stage 1 corresponds to the top of the condenser and stage 5, to the bottom, and this is represented by the x-axis. The y-axis represents the mole fraction for each of the compounds.

In this example, stream 22 is pumped into rectification column 38, where it is separated to form stream 40 and stream 42. At 95 psia, stream 16 has a temperature of 125 K and comprises 87.9 mol % $CF_4$ and 13.1 mol % nitrogen. At 96 psia, stream 42 has a temperature of 209 K and comprises 28.6 mol % $CF_4$, 57.1 mol % $C_2F_6$ and 14.3 mol % $SF_6$.

The recovery efficiencies of $CF_4$, $C_2F_6$, and $SF_6$ are 99.5%, 100% and 100% respectively. The PFC product contains 1 ppm nitrogen carrier gas. A 2,000 scfh system consumes approximately 50 lb/hr of liquid nitrogen refrigerant Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A system for recovering PFCs using condensation comprising
   a) a condenser to provide indirect heat transfer from a PFC-containing gaseous stream to effect liquefaction into a PFC-containing condensate and a carrier gas stream;
   b) a mass transfer unit to fractionate said PFC-containing condensate into a high volatility PFC stream and a PFC product; and
   c) a heat exchange unit for cooling said PFC-containing feed stream Prior to passing said feed stream into said condenser; wherein said high volatility PFC stream is recycled to combine with said PFC-containing feed stream.

2. The system of claim 1 where in a stream providing refrigeration is added to said carrier gas stream for recycling into said condenser.

3. The system of claim 1 wherein said condenser is a reflux condenser.

4. A method for recovering PFCs using condensation comprising
   a) passing a PFC-containing feed stream into a condenser to effect liquefaction into a PFC-containing condensate and a carrier gas stream;
   b) passing said PFC-containing condensate into a mass transfer unit to fractionate said PFC-containing condensate into a high volatility PFC stream and a PFC product; and
   c) cooling said PFC-containing feed stream into a heat exchange unit prior to passing said feed stream into said condenser so as to recycle said high volatility PFC stream to combine with said PFC-containing feed stream.

5. The method of claim 4 which comprises adding a stream to provide refrigeration to said carrier gas stream for recycling into said condenser.

6. The method of claim 4 which comprises recovering PFCs using a reflux condenser.

* * * * *